(12) United States Patent
Matsumoto et al.

(10) Patent No.: US 8,430,496 B2
(45) Date of Patent: Apr. 30, 2013

(54) INK, INK CARTRIDGE, AND INK JET RECORDING METHOD

(75) Inventors: Nobuyuki Matsumoto, Tokyo (JP); Fumiaki Fujioka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 316 days.

(21) Appl. No.: 13/015,093

(22) Filed: Jan. 27, 2011

(65) Prior Publication Data
US 2011/0187786 A1 Aug. 4, 2011

(30) Foreign Application Priority Data
Jan. 29, 2010 (JP) ................. 2010-019438

(51) Int. Cl.
*B41J 2/05* (2006.01)
*C09D 11/02* (2006.01)

(52) U.S. Cl.
USPC ........................................ 347/100; 106/31.6

(58) Field of Classification Search .......... 347/20, 347/86, 95, 100; 106/31.13, 31.6; 523/171
See application file for complete search history.

(56) References Cited

U.S. PATENT DOCUMENTS

| 6,284,029 B1 | 9/2001 | Sano |
| 6,322,188 B1 | 11/2001 | Sano |
| 6,702,883 B1 * | 3/2004 | Sano et al. ........... 106/31.6 |
| 7,931,743 B2 * | 4/2011 | Saito et al. ........... 106/31.6 |
| 2007/0263054 A1 | 11/2007 | Yatake |

FOREIGN PATENT DOCUMENTS

| JP | 2000-345080 A | 12/2000 |
| JP | 3455764 B2 | 10/2003 |
| JP | 2004-099734 A | 4/2004 |
| JP | 2007-099917 A | 4/2007 |

* cited by examiner

*Primary Examiner* — An Do
(74) *Attorney, Agent, or Firm* — Canon U.S.A., Inc., IP Division

(57) ABSTRACT

An ink contains a plurality of pigments and a plurality of polymers. The plurality of pigments include C.I. pigment yellow 4 and C.I. pigment yellow 128. The plurality of polymers include a polymer A and a polymer B. The C.I. pigment yellow 74 is dispersed by the polymer A. The C.I. pigment yellow 128 is dispersed by the polymer B. A hydrogen bond parameter $Y_A$ of a unit having the smallest hydrogen bond parameter of the constitutional units of the polymer A and a hydrogen bond parameter $Y_B$ of a unit having the smallest hydrogen bond parameter of the constitutional units of the polymer B satisfy the relationship of $Y_A<Y_B$. A hydrogen bond parameter $P_A$ of the polymer A and a hydrogen bond parameter $P_B$ of the polymer B satisfy the relationship of $P_A<P_B$.

7 Claims, 1 Drawing Sheet

INK, INK CARTRIDGE, AND INK JET RECORDING METHOD

BACKGROUND OF THE INVENTION

1. Field of the Invention

The present invention relates to an ink containing pigment, an ink cartridge containing the ink, and an ink jet recording method. The ink can be suitable for a yellow ink jet ink.

2. Description of the Related Art

In recent years, recorded images have been used indoors and outdoors as notices, such as posters and point-of-purchase (POP) advertising. The light resistance and the scratch resistance of images should therefore be improved in ink jet recording. Inks containing pigment, that is, pigment inks are increasingly used to improve these characteristics. However, pigment inks generally have lower color developability than inks containing dye. Furthermore, pigment inks generally produce images of low-glossiness because of pigment particles. Thus, pigment inks need to achieve high glossiness and color developability, as well as high light resistance and scratch resistance.

Among inks used in ink jet recording, yellow inks are particularly required to produce images having high color developability. Thus, various yellow pigment inks have been proposed.

For example, C.I. pigment yellow 74 having high color developability, C.I. pigment yellow 128 having high light resistance, and a combination thereof have been intensively studied. For example, Japanese Patent No. 03455764 discloses a combination of C.I. pigment yellow 74 and C.I. pigment yellow 128 that can achieve both high color developability and high light resistance of images. Japanese Patent Laid-Open No. 2000-345080 discloses a recording method in which high-concentration regions and low-concentration regions are recorded with an ink containing C.I. pigment yellow 74 and an ink containing C.I. pigment yellow 128, respectively, to achieve both high color developability and high light resistance of images. Japanese Patent Laid-Open No. 2004-099734 discloses that an ink containing C.I. pigment yellow 74, 110, and 128 in which the proportion of C.I. pigment yellow 74 ranges from 10% to 20% of all the pigments can achieve both high light resistance and high color developability of images. Japanese Patent Laid-Open No. 2007-099917 discloses that an ink containing C.I. pigment yellow 74 and 138 in combination with a specific polymer can improve the color developability, glossiness, and light resistance of images and has high storage stability and ejection stability.

Although Japanese Patent No. 03455764 and Japanese Patent Laid-Open Nos. 2000-345080 and 2004-099734 can achieve high color developability and light resistance of images by utilizing the characteristics of the pigment, no attention is given to polymers, and the images have insufficient glossiness. Although paying attention to the characteristics of a polymer, Japanese Patent Laid-Open No. 2007-099917 aims to improve the color developability and glossiness of images and the storage stability of recorded images recognized as yellowing and employs only a single polymer with respect to the relationship between the pigment and the polymer, as in the patent literatures described above. All these patent literatures pay no attention to scratch resistance. The scratch resistance of images recorded with known ink jet inks, including the inks described in these patent literatures, is so low that the images are often damaged by a scratch with fingernails.

SUMMARY OF THE INVENTION

The present invention provides an ink that can achieve high color developability and light resistance of images as well as high glossiness and scratch resistance of the images, an ink cartridge containing the ink, and an ink jet recording method.

An ink according to one aspect of the present invention includes a plurality of pigments and a plurality of polymers. The plurality of pigments includes C.I. pigment yellow 74 and C.I. pigment yellow 128. The plurality of polymers include a polymer A dispersing the C.I. pigment yellow 74 and a polymer B dispersing the C.I. pigment yellow 128. A hydrogen bond parameter $Y_A$ of a unit having the smallest hydrogen bond parameter of the constitutional units of the polymer A and a hydrogen bond parameter $Y_B$ of a unit having the smallest hydrogen bond parameter of the constitutional units of the polymer B satisfy the following formula 1. A hydrogen bond parameter $P_A$ of the polymer A and a hydrogen bond parameter $P_B$ of the polymer B satisfy the following formula 2.

$$Y_A < Y_B \quad \text{Formula 1}$$

$$P_A < P_B \quad \text{Formula 2}$$

The present invention can provide an ink that can achieve high color developability and light resistance of images as well as high glossiness and scratch resistance of the images, an ink cartridge containing the ink, and an ink jet recording method.

Further features of the present invention will become apparent from the following description of exemplary embodiments with reference to the attached drawings.

DESCRIPTION OF THE EMBODIMENTS

Figure 1A:
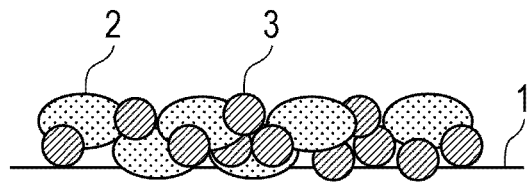
FIG. 1A is a schematic view of an image recorded with an ink according to an embodiment of the present invention.

The present invention will be described in detail in the following embodiments.

It is known that images recorded with inks containing dye exhibit excellent color developability. In contrast, images recorded with inks containing pigment exhibit poor color developability because the pigment is opaque and is present in the form of particles. Thus, inks containing pigment, particularly yellow inks, are required to have high color developability. On the other hand, inks containing pigment are superior to inks containing dye in the light resistance of images. As described in Japanese Patent No. 03455764 and Japanese Patent Laid-Open No. 2004-099734, some known inks contain C.I. pigment yellow 74 and C.I. pigment yellow 128 to achieve both high color developability and high light resistance of images.

In order to manufacture inks having high color developability of images, it is preferable to use C.I. pigment yellow 74, which has high color developability because of the characteristics of its molecular structure and hue angle. However, there is a disadvantage that C.I. pigment yellow 74 tends to deteriorate more easily than other organic pigments because C.I. pigment yellow 74 has an azo bond, which can be easily cleaved by light, in its molecular structure. Thus, C.I. pigment yellow 74 can be combined with C.I. pigment yellow 128, which has high light resistance because of its molecular structure resistant to photodegradation, to achieve both high color developability and light resistance of images.

An ink according to one embodiment of the present invention contains C.I. pigment yellow 74 and C.I. pigment yellow 128. These pigments are dispersed by these polymers respectively. More specifically, C.I. pigment yellow 74 is dispersed by a polymer A, and C.I. pigment yellow 128 is dispersed by a polymer B. One feature of the present invention resides in the control of the size relationship between pigment aggregates through the interaction between the pigment and the polymer.

As a result of investigations, the present inventors found that images having high color developability and light resistance as well as high glossiness and scratch resistance can be obtained by controlling the different aggregation states of pigments in ink on a recording medium in the following manner. That is, it is important to control the aggregation states of pigments such that aggregates of C.I. pigment yellow 74 are larger than aggregates of C.I. pigment yellow 128. The characteristics of the polymers A and B associated with these aggregation states are described below.

In an ink containing C.I. pigment yellow 74 dispersed by the polymer A and C.I. pigment yellow 128 dispersed by the polymer A applied to a recording medium, the pigments form their aggregates, thereby forming a pigment layer on the surface or the neighborhood of the surface of the recording medium. As a result of investigations, the present inventors arrived at the conclusion that, although the pigments have different aggregation speeds and aggregate sizes during the fixation of the ink on the recording medium, high-quality images can be obtained when the pigment type and the aggregate size satisfy the following relationship.

That is, the present inventors found that the formation of aggregates of C.I. pigment yellow 74 having relatively large sizes can further improve the high color developability of C.I. pigment yellow 74. The present inventors also found that, although C.I. pigment yellow 74 has low light resistance because of the characteristics of its molecular structure, an increase in aggregate size can improve the light resistance. At the same time, aggregates of C.I. pigment yellow 128 having relatively small sizes fill spaces between aggregates of C.I. pigment yellow 74 having relatively large sizes, thereby forming a uniform pigment layer.

This improves the smoothness of the pigment layer, that is, the surface of an image, increases the intensity of specular reflected light from the image, and consequently improves the glossiness of the image. The control of the size relationship between the aggregates does not compromise the advantageous light resistance of C.I. pigment yellow 128 but reduces the deterioration of C.I. pigment yellow 74. Thus, such an ink has higher light resistance than existing inks containing pigment dispersed by a single polymer taking no account of the size relationship between the aggregates. The uniform pigment layer (image) thus formed contains closely stacked aggregates and consequently has improved scratch resistance.

Figure 1B:
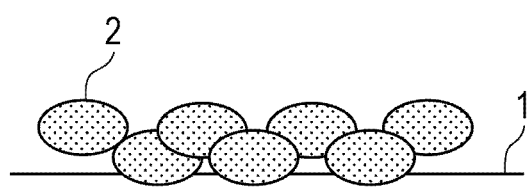
FIG. 1B is a schematic view of an image recorded with an ink containing a polymer A and C.I. pigment yellow 74.
Figure 1C:
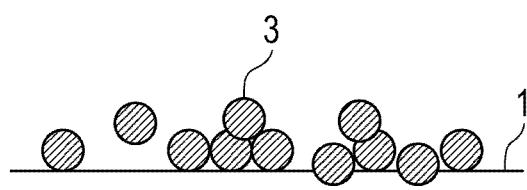
FIG. 1C is a schematic view of an image recorded with an ink containing a polymer B and C.I. pigment yellow 128.

FIGS. 1A to 1C are schematic views of an image recorded with a yellow ink containing pigment. FIG. 1A illustrates an ink according to an embodiment of the present invention. FIG. 1B illustrates an ink containing the polymer A and C.I. pigment yellow 74. FIG. 1C illustrates an ink containing the polymer B and C.I. pigment yellow 128. Reference numeral 1 denotes a recording medium, reference numeral 2 denotes aggregates of C.I. pigment yellow 74, and reference numeral 3 denotes aggregates of C.I. pigment yellow 128. The polymers in the ink illustrated in FIG. 1A satisfy the formulae 1 and 2 in the present invention. The polymers in the inks illustrated in FIGS. 1B and 1C are the same as the polymers in the ink illustrated in FIG. 1A. The aggregates 2 of C.I. pigment yellow 74 in the images in FIGS. 1A and 1B have substantially the same size. The aggregates 3 of C.I. pigment yellow 128 in the images in FIGS. 1A and 1C have substantially the same size. A comparison between the images (pigment layers) in FIGS. 1A, 1B, and 1C shows that the pigment layer in FIG. 1A has the smoothest surface and the highest degree of uniformity.

As a result of investigations to control the size relationship between the aggregates, the present inventors found that the polymers A and B dispersing each pigment should have the following characteristics. That is, the hydrogen bond parameters $Y_A$ and $Y_B$ of units having the smallest hydrogen bond parameters of the constitutional units of the polymers must satisfy the relationship of $Y_A<Y_B$ (the formula 1), and the hydrogen bond parameters $P_A$ and $P_B$ of the polymers must satisfy the relationship of $P_A<P_B$ (the formula 2). The reference signs A and B attached to Y and P represent the polymer type.

The present inventors presume the mechanism of providing the advantages of the present invention as follows. The hydrogen bond parameter of polymer is derived from a hydrogen bond. The affinity of polymer for water tends to increase with increasing hydrogen bond parameter. For example, in inks containing an aqueous medium as a major component, such as aqueous ink jet inks, a polymer having a larger hydrogen bond parameter is easily hydrated, resulting in lower aggregability of the polymer. The polymer A satisfying the formula 2 has a small hydrogen bond parameter and a low tendency of hydration. When an ink is applied to a recording medium, the polymer A aggregates rapidly, thus inducing the formation of aggregates of C.I. pigment yellow 74 dispersed by the polymer A. A higher tendency of aggregation of the polymer A can result in a larger aggregate size.

The polymer B satisfying the formula 2 has a large hydrogen bond parameter and is easily hydrated. Thus, the polymer B aggregates slowly. C.I. pigment yellow 128 dispersed by the polymer B also slowly forms aggregates as the aqueous medium of the ink permeates the recording medium. A lower tendency of aggregation of the polymer B can result in a smaller aggregate size. Since large aggregates of C.I. pigment yellow 74 have already formed a pigment layer on the surface or the neighborhood of the surface of the recording medium, small aggregates of C.I. pigment yellow 128 are arranged in spaces between the aggregates of C.I. pigment yellow 74. This improves the uniformity of the pigment layer.

In order to control the size relationship between the pigment aggregates through the interaction between the pigments and the polymers as described above, the following relationship must be satisfied, as well as the relationship of the hydrogen bond parameters $P_A$ and $P_B$ of the polymers (the formula 2). That is, the hydrogen bond parameters $Y_A$ and $Y_B$ of units having the smallest hydrogen bond parameters of the constitutional units of the polymer must satisfy the formula 1. A negative relationship of the formula 1, that is, $Y_A=Y_B$ or $Y_A>Y_B$ results in high mutual solubility between the polymers A and B containing the units having the smallest hydrogen bond parameters. This increases the compatibility between the polymer A dispersing C.I. pigment yellow 74 and the polymer B dispersing C.I. pigment yellow 128, making it difficult to control the size relationship between the pigment aggregates. In accordance with further investigations by the present inventors, when the formula 1 is satisfied but the formula 2 is not satisfied, both the polymers A and B are easily hydrated. This also makes it difficult to control the size relationship between the pigment aggregates. Thus, in order to achieve the advantages of the present invention, although the particle size of pigment in an ink has some effects, it is very important to determine polymers dispersing the pigments, such that the pigment aggregate sizes satisfy a specific relationship.

The hydrogen bond parameter defining a polymer for use in the present invention is calculated from the solubility parameter. The solubility parameter depends on the type of a functional group in the structure of a compound. The solubility parameter is a measure of compatibility between a plurality of compounds, that is, the affinity between the compounds. Compounds having similar solubility parameters tend to have a high degree of compatibility.

The solubility parameter can be classified into a dispersion force parameter ($\delta d$), which results from primary deviations in electron distribution, a polarity parameter ($\delta p$), which results from attractive and repulsive force generated by dipole moment, and a hydrogen bond parameter ($\delta h$), which results from a hydrogen bond formed by an active hydrogen or lone-pair electrons. In the present invention, the solubility parameter is applied to polymers and the constitutional units of the polymers. The affinity for water increases with increasing hydrogen bond parameter ($\delta h$). The hydrogen bond parameter of a polymer ($\delta h$) can be calculated from the solubility parameters for the constitutional units of the polymer. In this case, the hydrogen bond parameter can be calculated by a group contribution method, which considers an organic molecule as atomic groups, proposed by Krevelen. (See Krevelen, Properties of Polymer 2nd Edition, New York, 154 (1976)).

This method is described below. First, the dispersion force parameter ($\delta d$), the polarity parameter ($\delta p$), and the hydrogen bond parameter ($\delta h$) of the solubility parameter are determined from the molar dispersion force parameter Fdi, the molar polar force parameter Fpi, and the molar hydrogen bond strength parameter Fhi of the atomic groups of an organic molecule. The solubility parameter ($\delta$) can be determined from these parameters in accordance with the following equations.

$\delta d = (\Sigma Fdi)/V$ $\delta p = (\rho Fpi)/V$ $\delta h = (\Sigma Fhi)/V$ $\delta = (\delta d^2 + \delta p^2 + \delta h^2)^{1/2}$ (V denotes the sum of the molar volumes of the atomic groups.)

In the present invention, the solubility parameters for the constitutional units of a polymer are determined in this manner. In the present invention, the hydrogen bond parameters of the constitutional units of a polymer are the same as the hydrogen bond parameters of monomers constituting the units. Table 1 shows the hydrogen bond parameters ($\delta h$) of several units calculated from solubility parameters.

TABLE 1

Hydrogen bond parameters of units

| Type of unit | Abbreviation | Hydrogen bond parameter Y (cal$^{0.5}$/cm$^{1.5}$) |
| --- | --- | --- |
| Styrene | St | 0.00 |
| α-methylstyrene | α MSt | 0.00 |
| Benzyl methacrylate | BzMA | 3.21 |

TABLE 1-continued

Hydrogen bond parameters of units

| Type of unit | Abbreviation | Hydrogen bond parameter Y (cal$^{0.5}$/cm$^{1.5}$) |
| --- | --- | --- |
| Benzyl acrylate | BzA | 3.37 |
| n-butyl acrylate | nBA | 3.44 |
| Methyl methacrylate | MMA | 3.93 |
| Methacrylic acid | MAA | 5.30 |
| Acrylic acid | AA | 5.81 |

The hydrogen bond parameter of a polymer is calculated from the solubility parameters for the constitutional units of the polymer in the following manner. First, the hydrogen bond parameters of the constitutional units of a polymer are multiplied by the component (mass) ratio (one in total) of the constitutional units of the polymer. The resulting products are totaled to yield the hydrogen bond parameter of the polymer.

For example, the hydrogen bond parameter of a polymer 1 composed of styrene/n-butyl methacrylate/acrylic acid (the component (mass) ratio=32.6:33.5:33.9) used in the examples is determined in the following manner. As shown in Table 1, the hydrogen bond parameters of the constitutional units of the polymer 1, styrene, n-butyl acrylate, and acrylic acid, are 0.00, 3.44, and 5.81 (cal$^{0.5}$/cm$^{1.5}$), respectively. The hydrogen bond parameter of the polymer 1 is calculated as follows:

Hydrogen bond parameter of polymer 1 =

$0.00 \times 0.326 + 3.44 \times 0.335 + 5.81 \times 0.339 = 3.12$ (cal$^{0.5}$/cm$^{1.5}$).

Ink

The components of an ink according to an embodiment of the present invention will be described below.

Pigment

Pigments for use in an ink according to an embodiment of the present invention include C.I. pigment yellow 74 and C.I. pigment yellow 128, which are dispersed by a polymer A and a polymer B, respectively. The polymer A and the polymer B have different characteristics. Examples of the pigment dispersion method include, but are not limited to, a polymer dispersion type in which a polymer is physically adsorbed on the surfaces of pigment particles, a capsule type in which pigment particles are enclosed in a polymer, and a polymer bonding type in which a polymer is chemically bonded to the surfaces of pigment particles. These dispersion methods may be used in combination. It is desirable that the polymer A is physically adsorbed on the surfaces of C.I. pigment yellow 74, and the polymer B is physically adsorbed on the surfaces of C.I. pigment yellow 128. The pigments in the ink may have a particle size of 70 nm or more and 200 nm or less. The term "particle size" with respect to pigment, as used herein, refers to the average particle size $d_{50}$ based on volume.

The total content (% by mass) of pigments in the ink is preferably 1.0% by mass or more and 7.0% by mass or less, more preferably 3.0% by mass or more and 5.0% by mass or less with respect to the total mass of the ink. The content (% by mass) of C.I. pigment yellow 74 in the ink is preferably 1.2% by mass or more and 2.5% by mass or less with respect to the total mass of the ink. The content (% by mass) of C.I. pigment yellow 128 in the ink is preferably 1.7% by mass or more and 3.0% by mass or less with respect to the total mass of the ink.

As described above, the advantages of the present invention can be achieved by the formation of a uniform pigment layer through the interaction between the polymers and the pigments. As a result of investigations, the present inventors found that the content of C.I. pigment yellow 128 forming relatively small aggregates can be increased to improve the uniformity of the pigment layer formed of pigment aggregates having different sizes. This is probably because an increased number of aggregates of C.I. pigment yellow 128 can efficiently fill large spaces between relatively large aggregates of C.I. pigment yellow 74, thereby improving the uniformity of the pigment layer.

Thus, the ratio of the content (% by mass) of C.I. pigment yellow 128 with respect to the total mass of the ink to the content (% by mass) of C.I. pigment yellow 74 with respect to the total mass of the ink is preferably 1.1 times or more and 1.4 times or less. A relatively small content of C.I. pigment yellow 128 results in a small number of aggregates of C.I. pigment yellow 128 relative to the number of aggregates of C.I. pigment yellow 74. This cannot improve the uniformity of the pigment layer, resulting in insufficient color developability, glossiness, and scratch resistance of images. Meanwhile, even a relatively large content of C.I. pigment yellow 128 can improve the uniformity of the pigment layer to some extent. In this case, however, because aggregates of C.I. pigment yellow 74 would be surrounded by aggregates of C.I. pigment yellow 128, the advantageous color developability of images produced by the C.I. pigment yellow 74 may be impaired. Furthermore, since a relatively large content of C.I. pigment yellow 128 cannot efficiently improve the uniformity of the pigment layer, the resulting images may have insufficient glossiness.

As described above, use of the polymers A and B satisfying the formulae 1 and 2 can improve the scratch resistance of images. The mass ratio of the pigments within the range described above can result in a more effective increase in the uniformity of the pigment layer and a further improvement in the scratch resistance of images. A mass ratio more than 1.4 times results in an increase in the content of polymer B dispersing C.I. pigment yellow 128 around the surface portion of the pigment layer. This tends to improve the scratch resistance of images because of the characteristics of the polymer B as compared with the case where a larger content of polymer A is present around the surface portion of the pigment layer (at a mass ratio less than 1.1 times).

Polymer

The hydrogen bond parameters $Y_A$ and $Y_B$ of units having the smallest hydrogen bond parameters of the constitutional units of the polymers A and B for use in an ink according to an embodiment of the present invention must satisfy the formula 1, and the hydrogen bond parameters $P_A$ and $P_B$ of the polymers A and B must satisfy the formula 2. The polymers A and B may be any polymer provided that the polymer satisfies these formulae.

More specifically, the present invention may employ polymers containing a plurality of units derived from the following monomers (it is desirable that the polymers contain at least one hydrophobic monomer and at least one hydrophilic monomer). The polymers for use in an ink according to an embodiment of the present invention may be produced from the following monomers by a known polymerization method. The term "(meth)acryl", as used herein, refers to acryl or methacryl.

Examples of the monomers include, but are not limited to, hydrophobic monomers having an aromatic ring, such as styrene, α-methylstyrene, and benzyl(meth)acrylate; hydrophobic monomers having an aliphatic group, such as ethyl (meth)acrylate, (n-, iso-, t-)butyl(meth)acrylate, n-hexyl (meth)acrylate, methyl(meth)acrylate, and (iso)propyl (meth)acrylate; hydrophilic monomers having a hydroxy group, such as 2-hydroxyethyl (meth)acrylate and 3-hydroxypropyl (meth)acrylate; hydrophilic monomers having a carboxy group, such as (meth)acrylic acid, crotonic acid, ethacrylic acid, itaconic acid, maleic acid, and fumaric acid, and salts thereof; hydrophilic monomers having a sulfo group, such as styrenesulfonic acid, sulfonic acid-2-propyl (meth)acrylamide, (meth)acrylic acid-2-ethyl sulfonate, and butyl(meth)acrylamide sulfonic acid, and salts thereof; and hydrophilic monomers having a phosphonate group, such as (meth)acrylic acid-2-ethyl phosphonate, and salts thereof. Examples of cations of salt monomers include, but are not limited to, lithium, sodium, potassium, and (organic) ammonium.

The polymer A may contain a unit derived from at least one monomer selected from the group consisting of styrene, α-methylstyrene, n-butyl(meth)acrylate, and (meth)acrylic acid. The polymer A may contain a unit derived from styrene, n-butyl(meth)acrylate, and (meth)acrylic acid. The polymer B may contain a unit derived from at least one monomer selected from the group consisting of benzyl(meth)acrylate, n-butyl(meth)acrylate, and (meth)acrylic acid. The polymer B may contain a unit derived from benzyl(meth)acrylate and (meth)acrylic acid. Both of the polymers A and B may be an acrylic polymer containing a unit derived from acrylic monomers, such as (meth)acrylic acid or alkyl(meth)acrylate. In particular, the polymers, including the polymers A and B, in the ink may be an acrylic polymer.

In particular, the polymers A and B may have the following characteristics. Preferably, the hydrogen bond parameter $Y_A$ of a unit having the smallest hydrogen bond parameter of the constitutional units of the polymer A is 0 $cal^{0.5}/cm^{1.5}$. Preferably, the polymer A has a hydrogen bond parameter $P_A$ of 2.0 $cal^{0.5}/cm^{1.5}$ or more and 3.2 $cal^{0.5}/cm^{1.5}$ or less. Preferably, the hydrogen bond parameter $Y_B$ of a unit having the smallest hydrogen bond parameter of the constitutional units of the polymer B is 2.8 $cal^{0.5}/cm^{1.5}$ or more and 4.0 $cal^{0.5}/cm^{1.5}$ or less. Preferably, the polymer B has a hydrogen bond parameter $P_B$ of 3.5 $cal^{0.5}/cm^{1.5}$ or more and 4.5 $cal^{0.5}/cm^{1.5}$ or less.

As a result of investigations, the present inventors found that an increase in the size of aggregates of C.I. pigment yellow 74 and a decrease in the size of aggregates of C.I. pigment yellow 128 can further improve the uniformity of the pigment layer. This can further improve the color developability, glossiness, and scratch resistance of images. Thus, the polymer A may have a higher weight-average molecular weight than the polymer B. The satisfaction of this relationship tends to increase a difference in the size between the aggregates of C.I. pigment yellow 74 and the aggregates of C.I. pigment yellow 128. Although the relationship regarding the hydrogen bond parameters of the units having the smallest hydrogen bond parameter or the relationship regarding the hydrogen bond parameters of the polymers may cause aggregation, the weight-average molecular weight of the polymer A equal to or lower than the weight-average molecular weight of the polymer B will bring the following results. That is, the polymer A does not significantly promote the aggregation of C.I. pigment yellow 74 to form large aggregates, and the polymer B does not significantly reduce the aggregation of C.I. pigment yellow 128 to form small aggregates. Thus, the uniformity of the pigment layer cannot be further improved, and the color developability, glossiness, and scratch resistance of images may be insufficiently improved. Preferably, the polymer A has a weight-average molecular weight of 7,000 or more and 30,000 or less, more preferably 10,000 or more and 20,000 or less. Preferably, the polymer B has a weight-average molecular weight of 3,000 or more and 15,000 or less, more preferably 4,000 or more and 9,000 or less.

The acid value of the polymers depends on the type and composition of their constitutional units. Preferably, the polymer A has an acid value of 120 mgKOH/g or more and 350 mgKOH/g or less. Preferably, the polymer B has an acid value of 120 mgKOH/g or more and 350 mgKOH/g or less. In particular, the polymers A and B may be a water-soluble polymer that does not form particles when neutralized with an alkaline in an amount equivalent to the acid value.

Preferably, the ratio (PB ratio) of the pigment content to the polymer content in the ink ranges from 10:2 to 10:8, more preferably 10:3 to 10:7. It is desirable that both the PB ratio of C.I. pigment yellow 74 to the polymer A and the PB ratio of C.I. pigment yellow 128 to the polymer B be in this range.

As a result of investigations by the present inventors, in order to appropriately control the size relationship between the aggregates to improve the uniformity of the pigment layer, it is desirable that the polymer A dispersing C.I. pigment yellow 74 have a minimum influence on the aggregation of C.I. pigment yellow 128. More specifically, the content of the polymer A somewhat less than the content of C.I. pigment yellow 128 results in a further improvement in the uniformity of the pigment layer, thus providing higher color developability, glossiness, and scratch resistance of images. Preferably, the ratio of the content (% by mass) of polymer A with respect to the total mass of the ink to the content (% by mass) of C.I. pigment yellow 128 with respect to the total mass of the ink is 0.55 times or less. At a mass ratio more than 0.55 times, it is somewhat difficult to appropriately control the size relationship between the pigment aggregates. Thus, the uniformity of the pigment layer sometimes cannot be improved, and the color developability, glossiness, and scratch resistance of images sometimes cannot be sufficiently improved. Preferably, this mass ratio is 0.20 times or more.

Preferably, the content (% by mass) of polymer A in the ink is 0.2% by mass or more and 0.8% by mass or less with respect to the total mass of the ink. Preferably, the content (% by mass) of polymer B in the ink is 0.3% by mass or more and 0.9% by mass or less with respect to the total mass of the ink. The contents of polymers A and B can be determined in consideration of the PB ratio and the mass ratio of C.I. pigment yellow 128 to C.I. pigment yellow 74. Aqueous Medium An ink according to an embodiment of the present invention may contain an aqueous medium, such as water or a mixed solvent containing a water-soluble organic solvent. Water may be deionized water. Preferably, the content (% by mass) of water in the ink is 50.0% by mass or more and 95.0% by mass or less with respect to the total mass of the ink. Preferably, the content (% by mass) of water-soluble organic solvent in the ink is 3.0% by mass or more and 50.0% by mass or less with respect to the total mass of the ink. For inks containing a polyethylene glycol having an average molecular weight of 600 or more and 2,000 or less described below, the content of water-soluble organic solvent includes the content of polyethylene glycol. Examples of the water-soluble organic solvent include, but are not limited to, solvents for use in ink jet inks, such as alcohols, glycols, glycol ethers, and nitrogen-containing compounds. These solvents may be used alone or in combination.

An ink according to an embodiment of the present invention contains pigment dispersed by a polymer. As a result of investigations by the present inventors focusing on the solubility of a polymer in a water-soluble organic solvent, it is desirable that the ink further contain a polyethylene glycol having an average molecular weight of 200 or more and 2,000 or less. In such an ink applied to a recording medium, the polyethylene glycol reduces the solubility of polymers while water and other components evaporate, thereby generally promoting the aggregation of pigments. Thus, the polyethylene glycol having an average molecular weight of 200 or more and 2,000 or less can advantageously increase the aggregation speed and thereby appropriately control the size relationship between pigment aggregates, forming a more uniform pigment layer. More preferably, the polyethylene glycol has an average molecular weight of 1,000.

Preferably, the content (% by mass) of polyethylene glycol having an average molecular weight of 200 or more and 2,000 or less in the ink is 3.0% by mass or more and 5.0% by mass or less with respect to the total mass of the ink. As a result of investigations, the present inventors found that there is a correlation between the average molecular weight of polyethylene glycol and the polyethylene glycol content of the ink. More specifically, a small content of polyethylene glycol having a high average molecular weight has the same effects as a large content of polyethylene glycol having a low average molecular weight.

The term "the average molecular weight" of polyethylene glycol, as used herein, includes the range of from (the average molecular weight−30) to (the average molecular weight+30). For example, a polyethylene glycol having an average molecular weight of 1,000 means a polyethylene glycol having an average molecular weight in the range of 970 to 1,030. More specifically, a polyethylene glycol having an average molecular weight of 1,000 means a polyethylene glycol having an average molecular weight in the range of 970 to 1,030, as determined by a measurement method described below.

The average molecular weight of polyethylene glycol is determined in the following manner. One gram (weighed to 0.1 mg) of polyethylene glycol is placed in 25 mL of a pyridine solution of phthalic anhydride accurately weighed in a flask having a stopper, is stoppered, is heated for two hours in a boiling-water bath, and is left to stand to room temperature. Fifty milliliters (accurately weighed) of 0.5 mol/L aqueous sodium hydroxide and 10 drops of a phenolphthalein solution titrant are then added to the flask. The liquid in the flask is titrated with 0.5 mol/L aqueous sodium hydroxide. The titer at which the liquid remains red for 15 seconds is considered as the endpoint. From the titer M (mL) thus determined and a titer R (mL) in a blank test, the average molecular weight of the polyethylene glycol is calculated by the following equation. The blank test is performed in the same manner as described above except that the polyethylene glycol is not used. The average molecular weights of polyethylene glycols used in the examples described below were determined by this method.

$$\text{Average molecular weight} = \frac{\text{Polyethylene glycol (g)} \times 4000}{(\text{Titer } M \text{ (mL)} - \text{Titer } R \text{ (mL)}) \times 0.5 \text{ (mol/L)}}$$

Other Components

In addition to the components described above, an ink according to an embodiment of the present invention may contain a water-soluble organic compound that is solid at normal temperature, such as urea or a derivative thereof, trimethylolpropane, or trimethylolethane. If necessary, an ink according to an embodiment of the present invention may further contain various additive agents, such as a surfactant, an antifoaming agent, a pH adjusting agent, a preservative, and/or a fungicide.

Ink Cartridge

An ink cartridge according to an embodiment of the present invention includes an ink storage portion for storing an ink according to an embodiment of the present invention. The ink storage portion may include an ink chamber and a chamber for housing a negative-pressure-generating member. The ink chamber can store liquid ink. The negative-pressure-generating member can store ink by the action of a negative pressure. Alternatively, an ink cartridge according to an embodiment of the present invention may include no ink chamber and include an ink storage portion that includes a negative-pressure-generating member for storing the whole ink. Alternatively, an ink cartridge according to an embodiment of the present invention may include an ink storage portion and a recording head.

Ink Jet Recording Method

In an ink jet recording method according to an embodiment of the present invention, an ink according to an embodiment of the present invention is ejected from an ink jet recording head to record images on a recording medium. Ink may be ejected by the action of mechanical energy or thermal energy. In particular, an ink according to an embodiment of the present invention can be ejected by the action of thermal energy. The ink jet recording method may involve known processes except the use of an ink according to an embodiment of the present invention. The recording medium may be paper having ink absorption ability, such as plain paper or a recording medium having an ink-absorbing layer.

EXAMPLES

Although the present invention is further described below in the examples and comparative examples, the present invention is not limited to these examples within the gist of the present invention. Unless otherwise specified, "part" and "%" in the examples are based on mass. C.I. pigment yellow 74 and C.I. pigment yellow 128 are hereinafter also referred to as PY74 and PY128, respectively.

Synthesis of Polymer

Polymers having unit constitution (mass) ratios shown in Table 2 were synthesized from monomers by ordinary procedures. Each of the polymers thus synthesized was neutralized with 10.0% aqueous potassium hydroxide in a content equivalent to the acid value. Polymers 1 to 10 and 12 to 15 did not form particles and were water-soluble. Table 2 also shows the hydrogen bond parameter Y of a unit having the smallest hydrogen bond parameter of the constitutional units of the polymer, and the hydrogen bond parameter P, the weight-average molecular weight, and the acid value of the polymer. Abbreviations of units in Table 2 are the same as in Table 1.

TABLE 2

Principal characteristics of polymers

| Polymer No. | Constitutuon (mass) ratio of constitutional units of polymer | | | | | | | Weight average molecular weight | Acid value (mgKOH/g) | Hydrogen bond parameter $(cal^{0.5}/cm^{1.5})$ | |
|---|---|---|---|---|---|---|---|---|---|---|---|
| | St | α MSt | BzMA | BzA | nBA | MAA | AA | | | Y | P |
| 1 | 32.6 | | | | 33.5 | | 33.9 | 12,000 | 264 | 0.00 | 3.12 |
| 2 | 32.6 | | | | 33.5 | | 33.9 | 18,000 | 264 | 0.00 | 3.12 |
| 3 | 32.6 | | | | 33.5 | | 33.9 | 11,000 | 264 | 0.00 | 3.12 |
| 4 | | 35.3 | | | 30.1 | | 34.6 | 12,000 | 270 | 0.00 | 3.05 |
| 5 | | | 75.4 | | | 24.6 | | 7,500 | 160 | 3.21 | 3.72 |
| 6 | | | 75.4 | | | 24.6 | | 9,000 | 160 | 3.21 | 3.72 |
| 7 | | | 75.4 | | | 24.6 | | 3,500 | 160 | 3.21 | 3.72 |
| 8 | | | 71.0 | | | 29.0 | | 7,500 | 226 | 3.21 | 3.96 |
| 9 | | | | 69.1 | | 30.9 | | 7,500 | 201 | 3.44 | 4.01 |
| 10 | 59.1 | | | | | | 40.9 | 10,000 | 318 | 0.00 | 2.38 |
| 11 | | | | 90.6 | 2.4 | | 7.0 | 21,000 | 55 | 3.37 | 3.54 |
| 12 | 32.6 | | | | 33.5 | | 33.9 | 21,000 | 264 | 0.00 | 3.12 |
| 13 | 32.6 | | | | 33.5 | | 33.9 | 9,000 | 264 | 0.00 | 3.12 |
| 14 | | | 75.4 | | | 24.6 | | 12,000 | 160 | 3.21 | 3.72 |
| 15 | | | 75.4 | | | 24.6 | | 2,500 | 160 | 3.21 | 3.72 |

Preparation of Pigment Dispersion

The pigments (C.I. pigment yellow 74 and C.I. pigment yellow 128) and the polymers synthesized above were used to prepare pigment dispersions. More specifically, 100.0 parts of a mixture containing 10.0 parts of pigment, the required parts of polymer, and ion-exchanged water (the remainder) at the PB ratio (pigment (10):polymer (solid)) shown in Table 3 were dispersed by using a batch-type vertical sand mill for three hours. The dispersion was subjected to pressure filtration through a filter having a pore size of 2.5 μm (HDC II, manufactured by Nihon Pall Ltd.) to yield a pigment dispersion containing 10.0% pigment.

TABLE 3

Composition and principal characteristics of pigment dispersion

| Pigment dispersion No. | PB ratio | Type of pigment | Polymer | | | | |
|---|---|---|---|---|---|---|---|
| | | | No. | Weight average molecular weight | Acid value (mgKOH/g) | Hydrogen bond parameter $(cal^{0.5}/cm^{1.5})$ | |
| | | | | | | Y | P |
| 1 | 10:5 | PY74 | 1 | 12,000 | 264 | 0.00 | 3.12 |
| 2 | 10:5 | PY74 | 2 | 18,000 | 264 | 0.00 | 3.12 |
| 3 | 10:5 | PY74 | 3 | 11,000 | 264 | 0.00 | 3.12 |
| 4 | 10:7 | PY74 | 1 | 12,000 | 264 | 0.00 | 3.12 |
| 5 | 10:5 | PY74 | 5 | 7,500 | 160 | 3.21 | 3.72 |
| 6 | 10:5 | PY74 | 4 | 12,000 | 270 | 0.00 | 3.05 |
| 7 | 10:6 | PY74 | 1 | 12,000 | 264 | 0.00 | 3.12 |
| 8 | 10:5 | PY128 | 5 | 7,500 | 160 | 3.21 | 3.72 |
| 9 | 10:5 | PY128 | 6 | 9,000 | 160 | 3.21 | 3.72 |
| 10 | 10:5 | PY128 | 7 | 3,500 | 160 | 3.21 | 3.72 |
| 11 | 10:7 | PY128 | 5 | 7,500 | 160 | 3.21 | 3.72 |
| 12 | 10:5 | PY128 | 1 | 12,000 | 264 | 0.00 | 3.12 |
| 13 | 10:5 | PY128 | 8 | 7,500 | 226 | 3.21 | 3.96 |
| 14 | 10:5 | PY128 | 9 | 7,500 | 201 | 3.44 | 4.01 |

TABLE 3-continued

Composition and principal characteristics of pigment dispersion

| Pigment dispersion No. | PB ratio | Type of pigment | Polymer No. | Weight average molecular weight | Acid value (mgKOH/g) | Hydrogen bond parameter ($cal^{0.5}/cm^{1.5}$) Y | P |
|---|---|---|---|---|---|---|---|
| 15 | 10:6 | PY128 | 5 | 7,500 | 160 | 3.21 | 3.72 |
| 16 | 10:5 | PY74 | 10 | 10,000 | 318 | 0.00 | 2.38 |
| 17 | 10:5 | PY128 | 10 | 10,000 | 318 | 0.00 | 2.38 |
| 18 | 10:5 | PY74 | 11 | 21,000 | 55 | 3.37 | 3.54 |
| 19 | 10:5 | PY74 | 12 | 21,000 | 264 | 0.00 | 3.12 |
| 20 | 10:5 | PY74 | 13 | 9,000 | 264 | 0.00 | 3.12 |
| 21 | 10:5 | PY128 | 14 | 12,000 | 160 | 3.21 | 3.72 |
| 22 | 10:5 | PY128 | 15 | 2,500 | 160 | 3.21 | 3.72 |
| 23 | 10:5 | PY74 | 11 | 21,000 | 55 | 3.37 | 3.54 |
| 24 | 10:5 | PY128 | 11 | 21,000 | 55 | 3.37 | 3.54 |

Preparation of Ink

A mixture of the components shown in Table 4 was sufficiently agitated and was subjected to pressure filtration through a filter having a pore size of 2.5 μm (HDC II, manufactured by Nihon Pall Ltd.) to prepare an ink. Table 5 shows the principal characteristics of the inks thus prepared. Table 5 shows the hydrogen bond parameter expressed in $cal^{0.5}/cm^{1.5}$ and the contents of components in the inks (unit:%). In the column of the relationship of the formula 1 or 2, Y indicates that the relationship was satisfied, and N indicates that the relationship was not satisfied. PY128/PY74 represents the ratio of the content of C.I. pigment yellow 128 to the content of C.I. pigment yellow 74 (unit:times). Polymer A/PY128 represents the ratio of the content of polymer A to the content of C.I. pigment yellow 128 (unit:times). The particle size (average particle size $d_{50}$ based on volume) of pigment in the ink was measured with a laser particle size analysis system (FPAR-1000, manufactured by Otsuka Electronics Co., Ltd.). C.I. pigment yellow 74 had a $d_{50}$ of approximately 130 nm, and C.I. pigment yellow 128 had a $d_{50}$ of approximately 110 nm.

TABLE 4

Compositions of inks (Unit of composition: %)

| | | Pigment dispersion containing PY74 | | Pigment dispersion containing PY128 | | Glycerin | 2-pyrrolidone | 1,2-hexane diol | Polyethylene glycol | | Acetylenol E100 | Ion-exchanged water |
|---|---|---|---|---|---|---|---|---|---|---|---|---|
| | | No. | Amount | No. | Amount | | | | Average molecular weight | Amount | | |
| Example | 1 | 1 | 15.0 | 8 | 20.0 | 7.0 | 1.0 | 3.0 | 1,000 | 3.0 | 0.8 | 50.2 |
| | 2 | 16 | 15.0 | 13 | 20.0 | 7.0 | 1.0 | 3.0 | 1,000 | 3.0 | 0.8 | 50.2 |
| | 3 | 6 | 15.0 | 14 | 20.0 | 7.0 | 1.0 | 3.0 | 1,000 | 3.0 | 0.8 | 50.2 |
| | 4 | 7 | 15.0 | 15 | 20.0 | 7.0 | 1.0 | 3.0 | 1,000 | 3.0 | 0.8 | 50.2 |
| | 5 | 2 | 15.0 | 9 | 20.0 | 7.0 | 1.0 | 3.0 | 1,000 | 3.0 | 0.8 | 50.2 |
| | 6 | 3 | 15.0 | 10 | 20.0 | 7.0 | 1.0 | 3.0 | 1,000 | 3.0 | 0.8 | 50.2 |
| | 7 | 1 | 15.0 | 8 | 20.0 | 7.0 | 1.0 | 3.0 | 600 | 5.0 | 0.8 | 48.2 |
| | 8 | 1 | 15.0 | 8 | 20.0 | 7.0 | 1.0 | 3.0 | 2,000 | 1.0 | 0.8 | 52.2 |
| | 9 | 1 | 17.5 | 8 | 17.5 | 7.0 | 1.0 | 3.0 | 1,000 | 3.0 | 0.8 | 50.2 |
| | 10 | 1 | 16.5 | 8 | 18.5 | 7.0 | 1.0 | 3.0 | 1,000 | 3.0 | 0.8 | 50.2 |
| | 11 | 1 | 14.6 | 8 | 20.4 | 7.0 | 1.0 | 3.0 | 1,000 | 3.0 | 0.8 | 50.2 |
| | 12 | 1 | 14.0 | 8 | 21.0 | 7.0 | 1.0 | 3.0 | 1,000 | 3.0 | 0.8 | 50.2 |
| | 13 | 4 | 14.5 | 11 | 18.5 | 7.0 | 1.0 | 3.0 | 1,000 | 3.0 | 0.8 | 52.2 |
| | 14 | 4 | 16.0 | 11 | 18.0 | 7.0 | 1.0 | 3.0 | 1,000 | 3.0 | 0.8 | 51.2 |
| | 15 | 1 | 15.0 | 21 | 20.0 | 7.0 | 1.0 | 3.0 | 2,000 | 3.0 | 0.8 | 50.2 |
| | 16 | 20 | 15.0 | 21 | 20.0 | 7.0 | 1.0 | 3.0 | 2,000 | 3.0 | 0.8 | 50.2 |
| | 17 | 1 | 15.0 | 8 | 20.0 | 7.0 | 1.0 | 3.0 | — | 0.0 | 0.8 | 53.2 |
| | 18 | 19 | 15.0 | 21 | 20.0 | 7.0 | 1.0 | 3.0 | 1,000 | 3.0 | 0.8 | 50.2 |
| | 19 | 20 | 15.0 | 22 | 20.0 | 7.0 | 1.0 | 3.0 | 1000 | 3.0 | 0.8 | 50.2 |
| Comparative example | 1 | 16 | 35.0 | — | 0.0 | 7.0 | 1.0 | 3.0 | 1,000 | 3.0 | 0.8 | 50.2 |
| | 2 | — | 0.0 | 17 | 42.0 | 7.0 | 1.0 | 3.0 | 1,000 | 3.0 | 0.8 | 43.2 |
| | 3 | 16 | 38.0 | 17 | 20.0 | 7.0 | 1.0 | 3.0 | 1,000 | 3.0 | 0.8 | 27.2 |
| | 4 | 5 | 15.0 | 12 | 20.0 | 7.0 | 1.0 | 3.0 | 1,000 | 3.0 | 0.8 | 50.2 |
| | 5 | 23 | 15.0 | 8 | 20.0 | 7.0 | 1.0 | 3.0 | 1,000 | 3.0 | 0.8 | 50.2 |
| | 6 | 5 | 15.0 | 24 | 20.0 | 7.0 | 1.0 | 3.0 | 1,000 | 3.0 | 0.8 | 50.2 |
| | 7 | 16 | 15.0 | 17 | 15.0 | 7.0 | 1.0 | 3.0 | 1,000 | 3.0 | 0.8 | 55.2 |
| | 8 | 16 | 12.0 | 17 | 18.0 | 7.0 | 1.0 | 3.0 | 1,000 | 3.0 | 0.8 | 55.2 |
| | 9 | 18 | 16.0 | — | 0.0 | 7.0 | 1.0 | 3.0 | 1,000 | 3.0 | 0.8 | 69.2 |

TABLE 5

Principal characteristics of inks

| | | Characteristics of polymer A | | | | Characteristics of polymer B | | | | Characteristics of ink | | | | | | |
|---|---|---|---|---|---|---|---|---|---|---|---|---|---|---|---|---|
| | | No. of polymer A | $Y_A$ | $P_A$ | Weight average molecular weight | No. of polymer B | $Y_B$ | $P_B$ | Weight average molecular weight | Formula 1 | Formula 2 | Content | | | | |
| | | | | | | | | | | | | PY74 | Polymer A | PY128 | Polymer B | PY128/PY74 | Polymer A/PY128 |
| Example | 1 | 1 | 0.00 | 3.12 | 12,000 | 5 | 3.21 | 3.72 | 7,500 | Y | Y | 1.5 | 0.75 | 2.0 | 1.00 | 1.3 | 0.38 |
| | 2 | 10 | 0.00 | 2.38 | 10,000 | 8 | 3.21 | 3.96 | 7,500 | Y | Y | 1.5 | 0.75 | 2.0 | 1.00 | 1.3 | 0.38 |
| | 3 | 4 | 0.00 | 3.05 | 12,000 | 9 | 3.44 | 4.01 | 7,500 | Y | Y | 1.5 | 0.75 | 2.0 | 1.00 | 1.3 | 0.38 |
| | 4 | 1 | 0.00 | 3.12 | 12,000 | 5 | 3.21 | 3.72 | 7,500 | Y | Y | 1.5 | 0.90 | 2.0 | 1.20 | 1.3 | 0.45 |
| | 5 | 2 | 0.00 | 3.12 | 18,000 | 6 | 3.21 | 3.72 | 9,000 | Y | Y | 1.5 | 0.75 | 2.0 | 1.00 | 1.3 | 0.38 |
| | 6 | 3 | 0.00 | 3.12 | 11,000 | 7 | 3.21 | 3.72 | 3,500 | Y | Y | 1.5 | 0.75 | 2.0 | 1.00 | 1.3 | 0.38 |
| | 7 | 1 | 0.00 | 3.12 | 12,000 | 5 | 3.21 | 3.72 | 7,500 | Y | Y | 1.5 | 0.75 | 2.0 | 1.00 | 1.3 | 0.38 |
| | 8 | 1 | 0.00 | 3.12 | 12,000 | 5 | 3.21 | 3.72 | 7,500 | Y | Y | 1.5 | 0.75 | 2.0 | 1.00 | 1.3 | 0.38 |
| | 9 | 1 | 0.00 | 3.12 | 12,000 | 5 | 3.21 | 3.72 | 7,500 | Y | Y | 1.8 | 0.88 | 1.8 | 0.88 | 1.0 | 0.50 |
| | 10 | 1 | 0.00 | 3.12 | 12,000 | 5 | 3.21 | 3.72 | 7,500 | Y | Y | 1.7 | 0.83 | 1.9 | 0.93 | 1.1 | 0.45 |
| | 11 | 1 | 0.00 | 3.12 | 12,000 | 5 | 3.21 | 3.72 | 7,500 | Y | Y | 1.5 | 0.73 | 2.0 | 1.02 | 1.4 | 0.36 |
| | 12 | 1 | 0.00 | 3.12 | 12,000 | 5 | 3.21 | 3.72 | 7,500 | Y | Y | 1.4 | 0.70 | 2.1 | 1.05 | 1.5 | 0.33 |
| | 13 | 1 | 0.00 | 3.12 | 12,000 | 5 | 3.21 | 3.72 | 7,500 | Y | Y | 1.5 | 1.02 | 1.9 | 1.30 | 1.3 | 0.55 |
| | 14 | 1 | 0.00 | 3.12 | 12,000 | 5 | 3.21 | 3.72 | 7,500 | Y | Y | 1.6 | 1.12 | 1.8 | 1.26 | 1.1 | 0.62 |
| | 15 | 1 | 0.00 | 3.12 | 12,000 | 14 | 3.21 | 3.72 | 12,000 | Y | Y | 1.5 | 0.75 | 2.0 | 1.00 | 1.3 | 0.38 |
| | 16 | 13 | 0.00 | 3.12 | 9,000 | 14 | 3.21 | 3.72 | 12,000 | Y | Y | 1.5 | 0.75 | 2.0 | 1.00 | 1.3 | 0.38 |
| | 17 | 1 | 0.00 | 3.12 | 12,000 | 5 | 3.21 | 3.72 | 7,500 | Y | Y | 1.5 | 0.75 | 2.0 | 1.00 | 1.3 | 0.38 |
| | 18 | 12 | 0.00 | 3.12 | 21,000 | 14 | 3.21 | 3.72 | 12,000 | Y | Y | 1.5 | 0.75 | 2.0 | 1.00 | 1.3 | 0.38 |
| | 19 | 13 | 0.00 | 3.12 | 9,000 | 15 | 3.21 | 3.72 | 2,500 | Y | Y | 1.5 | 0.75 | 2.0 | 1.00 | 1.3 | 0.38 |
| Comparative Example | 1 | 10 | 0.00 | 2.38 | 10,000 | — | — | — | — | N | N | 3.5 | 1.75 | — | — | — | — |
| | 2 | — | — | — | — | 10 | 0.00 | 2.38 | 10,000 | N | N | — | — | 4.2 | 2.10 | — | — |
| | 3 | 10 | 0.00 | 2.38 | 10,000 | 10 | 0.00 | 2.38 | 10,000 | N | N | 3.8 | 1.90 | 2.0 | 1.00 | 0.5 | 0.95 |
| | 4 | 5 | 3.21 | 3.72 | 7,500 | 1 | 0.00 | 3.12 | 12,000 | N | N | 1.5 | 0.75 | 2.0 | 1.00 | 1.3 | 0.38 |
| | 5 | 11 | 3.37 | 3.54 | 21,000 | 5 | 3.21 | 3.72 | 7,500 | N | Y | 1.5 | 0.75 | 2.0 | 1.00 | 1.3 | 0.38 |
| | 6 | 5 | 3.21 | 3.72 | 7,500 | 11 | 3.37 | 3.54 | 21,000 | Y | N | 1.5 | 0.75 | 2.0 | 1.00 | 1.3 | 0.38 |
| | 7 | 10 | 0.00 | 2.38 | 10,000 | 10 | 0.00 | 2.38 | 10,000 | N | N | 1.5 | 0.75 | 1.5 | 0.75 | 1.0 | 0.50 |
| | 8 | 10 | 0.00 | 2.38 | 10,000 | 10 | 0.00 | 2.38 | 10,000 | N | N | 1.2 | 0.60 | 1.8 | 0.90 | 1.5 | 0.33 |
| | 9 | 11 | 3.37 | 3.54 | 21,000 | — | — | — | — | N | N | 1.6 | 0.80 | — | — | — | — |

Evaluation

An ink cartridge filled with the ink thus prepared was installed in an ink jet recording apparatus (PIXUS 990i, manufactured by CANON KABUSHIKI KAISHA), which includes a recording head that ejects ink by thermal energy. Recorded articles containing solid images of six tones were formed on recording media (CANON Photo Paper Gold Glossy GL-101, manufactured by CANON KABUSHIKI KAISHA) at a duty in the range of 150% to 200% in increments of 10%. The ink jet recording apparatus has a resolution of 600 dpi×600 dpi. At a duty of 100%, eight drops of 2.5 picoliters of ink droplets are applied to a unit area of 1/600 inch×1/600 inch.

As evaluation criteria, C represents an unacceptable level, and B, A, AA, and AAA represent acceptable levels, wherein performance is improved in this order. For example, in the case of light resistance and color developability, A represents the highest level. For glossiness and scratch resistance, AAA represents the highest level. Table 6 shows the results.

Evaluation of Light Resistance

The recorded articles were placed in a weather meter (Atlas Fade-Ometer, Toyo Seiki Seisaku-Sho, Ltd.). Then, the recorded articles were irradiated with xenon light having a wavelength of 340 nm at an irradiation intensity of 0.39 W/m² for 100 and 150 hours, at a temperature of 63° C. on a black panel, at an air temperature in the tank of 50° C. and in a humidity of 70% RH. L*, a*, and b* (CIELab color system) of solid images at each of the print duties were measured before and after irradiation with a spectrophotometer (Spectrolino, manufactured by GretagMacbeth). ΔE was determined from E={(L*)²+(a*)²+(b*)²}^{1/2} calculated before and after irradiation. The light resistance of images was evaluated on the basis of the maximum ΔE at each of the print duties. The evaluation criteria for light resistance are as follows:
  A: Both ΔE determined before and after irradiation for 100 hours and ΔE determined before and after irradiation for 150 hours were less than four;
  B: ΔE determined before and after irradiation for 100 hours was less than four and ΔE determined before and after irradiation for 150 hours was four or more; and
  C: Both ΔE determined before and after irradiation for 100 hours and ΔE determined before and after irradiation for 150 hours were four or more.

Evaluation of Color Developability

L*, a*, and b* (CIELab color system) of solid images at each of the print duties were measured with a spectrophotometer (Spectrolino, manufactured by GretagMacbeth). Saturation C*={(L*)²+(a*)²+(b*)²}^{1/2} was calculated. The color developability of images was evaluated on the basis of the maximum C* at each of the print duties. The evaluation criteria for color developability are as follows:
  A: C* was 110 or more;
  B: C* was 100 or more and less than 110; and
  C: C* was less than 100.

Evaluation of Glossiness

The 20° gloss G of the recorded articles was measured with a gloss meter (Micro-haze plus, manufactured by BYK Gardner). The glossiness of the recorded articles was evaluated on the basis of the maximum G at each of the print duties. The evaluation criteria for glossiness are as follows:
  AAA: G was 80 or more;
  AA: G was 75 or more and less than 80;
  A: G was 70 or more and less than 75;
  B: G was 65 or more and less than 70; and
  C: G was less than 65.

Evaluation of Scratch Resistance

The recorded articles described above were air-dried at normal temperature for 24 hours. A solid image printed at a duty of 200% was then scratched approximately one inch with a fingernail and was visually inspected. Since this test was organoleptic, in order to compensate for variations, five testers assessed the scratch resistance in five grades from AAA (five points) to C (one point), and the points were averaged (rounded to one decimal place).

AAA: Substantially no scratch was observed.
AA: Although a scratch was noticeable, the white ground of the recording medium was not observed.
A: The white ground of the recording medium was observed in part of the scratch.
B: The white ground of the recording medium was observed in most part of the scratch.
C: The white ground of the recording medium was observed in the whole part of the scratch.

TABLE 6

| | | Results | | | |
|---|---|---|---|---|---|
| | | Light resistance | Color developability | Glossiness | Scratch resistance |
| Example | 1 | A | A | AAA | AAA |
| | 2 | A | A | AAA | AAA |
| | 3 | A | A | AAA | AAA |
| | 4 | A | A | AAA | AAA |
| | 5 | A | A | AAA | AAA |
| | 6 | A | A | AAA | AAA |
| | 7 | A | A | AAA | AAA |
| | 8 | A | A | AAA | AAA |
| | 9 | A | B | AA | AA |
| | 10 | A | A | AAA | AAA |
| | 11 | A | A | AAA | AAA |
| | 12 | A | B | AA | AAA |
| | 13 | A | A | AAA | AAA |
| | 14 | A | B | AA | AA |
| | 15 | A | B | AA | AA |
| | 16 | A | B | AA | AA |
| | 17 | B | B | B | A |
| | 18 | B | B | B | AA |
| | 19 | B | B | B | AA |
| Comparative example | 1 | C | B | C | B |
| | 2 | A | C | C | B |
| | 3 | B | B | C | B |
| | 4 | B | B | C | A |
| | 5 | B | B | C | A |
| | 6 | B | B | C | A |
| | 7 | B | B | C | B |
| | 8 | B | B | C | B |
| | 9 | C | B | B | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-019438 filed Jan. 29, 2010, which is hereby incorporated by reference herein in its entirety.

What is claimed is:

1. An ink comprising:
   a plurality of pigments and
   a plurality of polymers;
   wherein the plurality of pigments comprise C.I. pigment yellow 74 and C.I. pigment yellow 128,
   the plurality of polymers comprise a polymer A dispersing the C.I. pigment yellow 74 and a polymer B dispersing the C.I. pigment yellow 128, and
   a hydrogen bond parameter $Y_A$ of a unit having the smallest hydrogen bond parameter of the constitutional units of the polymer A and a hydrogen bond parameter $Y_B$ of a unit having the smallest hydrogen bond parameter of the constitutional units of the polymer B satisfy the following formula 1, and a hydrogen bond parameter $P_A$ of the polymer A and a hydrogen bond parameter $P_B$ of the polymer B satisfy the following formula 2.

$$Y_A < Y_B \quad \text{Formula 1}$$

$$P_A < P_B \quad \text{Formula 2}$$

2. The ink according to claim 1, wherein the ratio of the content (% by mass) of C.I. pigment yellow 128 with respect to the total mass of the ink to the content (% by mass) of C.I. pigment yellow 74 with respect to the total mass of the ink is 1.1 times or more and 1.4 times or less.

3. The ink according to claim 1, wherein the ratio of the content (% by mass) of the polymer A with respect to the total mass of the ink to the content (% by mass) of C.I. pigment yellow 128 with respect to the total mass of the ink is 0.55 times or less.

4. The ink according to claim 1, wherein the polymer A has a higher weight-average molecular weight than the polymer B.

5. The ink according to claim 1, further comprising a polyethylene glycol having an average molecular weight of 600 or more and 2,000 or less.

6. An ink cartridge comprising an ink storage portion to store an ink, wherein the ink according to claim 1 is stored in the ink storage portion.

7. An ink jet recording method comprising ejecting an ink by an ink jet method to record an image on a recording medium, wherein the ink is an ink according to claim 1.

* * * * *